Sept. 11, 1923.   1,467,372
L. F. GEILS
HEADLIGHT DEFLECTOR
Filed May 15, 1922
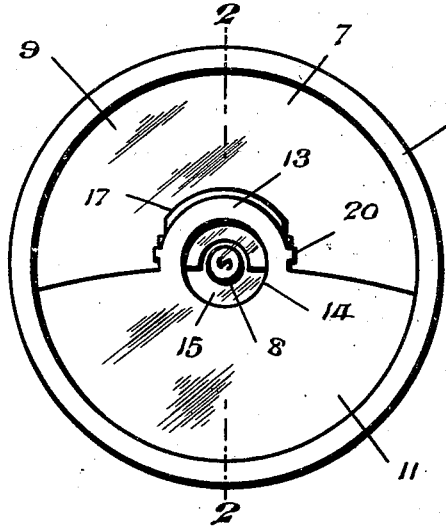
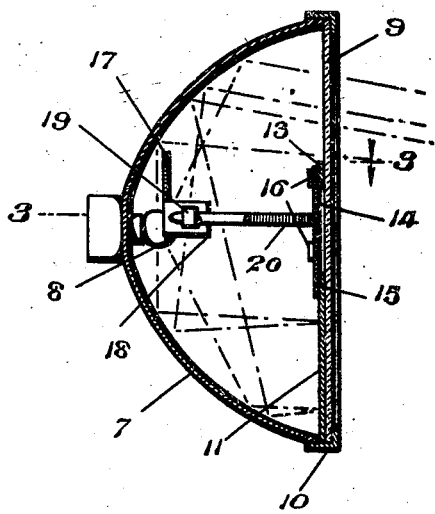
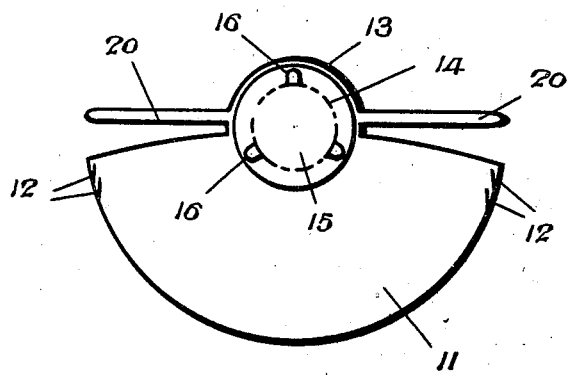
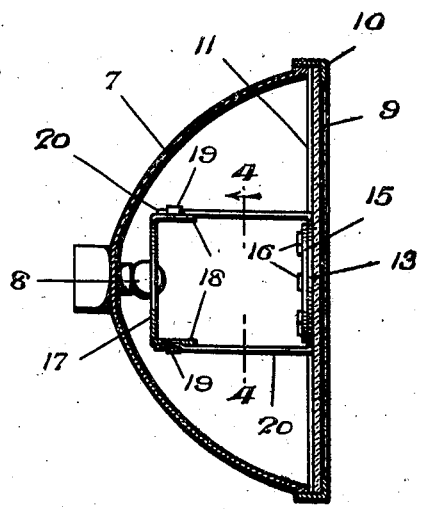
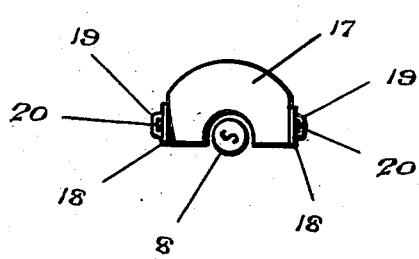
Inventor.
L. F. GEILS,
By W. J. Fitz Gerald & Co.
Attorney.

Patented Sept. 11, 1923.

1,467,372

UNITED STATES PATENT OFFICE.

LOUIS F. GEILS, OF CHICAGO, ILLINOIS.

HEADLIGHT DEFLECTOR.

Application filed May 15, 1922. Serial No. 561,125.

*To all whom it may concern:*

Be it known that I, LOUIS F. GEILS, a citizen of the United States, residing at Chicago, in the county of Cook and State of Illinois, have invented certain new and useful Improvements in Headlight Deflectors; and I do hereby declare the following to be a full, clear, and exact description of the invention, such as will enable others skilled in the art to which it appertains to make and use the same.

The present invention relates to a light deflector for use with the head lamps of motor vehicles, and aims to provide a novel and improved device of that kind which will so deflect the light rays and restrict the projection thereof from the lamp, as to keep the light on the road ahead, and to avoid glaring light which is apt to blind or impair the vision of pedestrians and operators of other vehicles.

Another object is the provision of a deflector to be disposed across a portion of the lens or glass of the lamp casing, for deflecting the light rays back to the reflector, so as to pass out through the uncovered portion of said lens or glass, whereby the light is directed downwardly toward the road, with a minimum amount of light directed above the horizontal plane of the lamp.

A further object is the provision of such a deflector having a colored window for the passage of light rays forwardly in the axis of the lamp casing, for the color effect, and to also penetrate fog, as well as directing a colored beam or pencil of light substantially horizontally from the lamp to project a further distance from the vehicle, without producing an objectionable glare, and to enable objects for a considerable distance ahead to be observed, while the greater portion of the light is directed downwardly on the road a short distance ahead of the vehicle.

A still further object of the invention is the provision of a shield for the lamp bulb or source of light, which can be positioned for restricting the passage of the light rays from the bulb through the uncovered portion of the lens or glass of the lamp casing, such shield being supported from the deflector in a novel manner.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a front view of a headlight lamp casing showing the deflector installed therein.

Fig. 2 is a vertical section on the line 2—2 of Fig. 1, the shield being shown in elevation.

Fig. 3 is a horizontal section on the line 3—3 of Fig. 2.

Fig. 4 is a section on the line 4—4 of Fig. 3.

Fig. 5 is a rear view of the deflector showing the shield-supporting arms in flat position, as before bending.

The deflector is intended for use in the headlight lamp casing of a motor vehicle, including the parabolic reflector 7, and the lens or glass panel 9 disposed across the mouth of the reflector, and secured to the rim of the deflector by means of a flanged ring 10 removably secured on said rim of the reflector, according to the well known practice. The lamp bulb or source of light 8 is located within the reflector as usual, and with an ordinary lens or glass 9, the light rays are directed forwardly in a beam which increases in width and height, thereby spreading the light downwardly, sidewise and upwardly, resulting in considerable glare, as well known without lengthy discussion.

In carrying out the invention, there is provided an opaque deflector plate 11 of suitable sheet metal which is substantially semi-circular in shape, and which is disposed across the lower half or portion of the lens or panel 9, the convex edge of the plate 11 being clamped between the rim of the reflector 7 and the panel or lens 9. The plate is slit near the ends of said convex edge, to provide the sharp spurs or points 12 which can be bent slightly rearward, so as to bite the edge of the reflector 7 for holding the plate 11 in place, or said points may engage a washer or a felt or similar ring which is sometimes inserted between the rim of the reflector and the lens or glass (not shown).

The deflector plate 11 will prevent the light rays from passing through the lower portion of the panel 9, and the rear surface of said plate is polished or otherwise finished, so as to deflect the light rays back to the reflector 7 from which they are reflected upwardly and thence forwardly and downwardly by the upper portion of the reflector to pass through the panel 9 above the plate 11 with those rays which pass upwardly from the bulb 8 to strike the upper portion of the reflector. In this way, most of the light rays all reach the upper portion of the reflector 7, from which they are reflected forwardly and downwardly through the upper uncovered portion of the panel 9, to be directed down to the road, thereby keeping the light down low, and preventing objectionable glaring.

The plate 11 is provided centrally of its upper edge with a raised portion 13 having an opening 14 concentric with the lamp bulb 8 and axis of the lamp casing, for enabling a beam or pencil of light to pass from the bulb straight forward along the axis of the lamp casing. A sheet or panel 15 of glass, celluloid or other transparent material is disposed across the opening 14 in rear of the plate 11, and is preferably of amber color, whereby to color the beam or pencil of light accordingly. This will enable such beam of light to penetrate fog, and to be projected forwardly to a considerable distance, without producing a glare that will be objectionable to persons in front of the vehicle. This colored window also adds to the distinctiveness and effect of the light directed from the lamp. As shown, the panel 15 is secured to the rear face of the plate 11 by means of lugs or ears 16 extending from the edge of the opening 14 through said panel and bent back against said panel away from the opening.

A shield 17 is disposed over or adjacent to the lamp bulb 8, in order to restrict or prevent the passage of light rays from the bulb straight out through the uncovered upper portion of the panel 9. This shield 17 is of sheet metal and is of flat arched form, to be disposed over the bulb 8 in a substantially vertical plane, and can be positioned to properly serve its office.

The shield 17 is supported from the deflector plate 11, and, for this purpose, the shield 17 is provided at its opposite ends with portions 18 bent to project forwardly and having the outstruck straps 19. Supporting arms or brackets 20 project from the opposite edges of the portion 13 of the plate 11, and are bent to project rearwardly and the rear terminals of said arms 20 are inserted through the straps 19, thereby supporting the shield 17 for forward and rearward sliding adjustments on said arms. When the shield has been properly adjusted and positioned, the adjustment is made permanent by clamping or clinching the straps 19 and arms 20 together. This will tend to bend or flatten out the straps 19, as seen in Fig. 3, so as to kink the arms 20, which will prevent the shield 17 from being adjusted accidentally or displaced from its proper position with reference to the deflector plate 11 and bulb 8. The shield being connected to the deflector plate is applied and removed as a unit with said plate. The shield 17 being of sheet metal is opaque, to prevent the light rays from passing from the bulb or source of light 8 upwardly in such a direction as to leave casing in an upward path, as might produce an objectionable glare.

Having thus described the invention, what is claimed as new is:—

1. A device of the character described comprising a deflector plate adapted to be positioned in the mouth of the reflector of a lamp casing to cover one portion only of the mouth of the reflector and to leave the other portion uncovered, said plate having a portion extending therefrom to be disposed directly in front of the source of light in the reflector, said portion having an opening for the direct forward passage of light rays, and a colored panel carried by said plate and disposed across said opening.

2. The combination in a vehicle head lamp, of a reflector having a source of light therein, means in the lower portion of the mouth of the reflector for deflecting light rays back to the reflector, the upper portion of said mouth being uncovered, and a substantially vertical shield in the reflector between the upper portion of the mouth and the source of light for restricting the direct passage of light rays through said uncovered portion of the mouth, but permitting the passage of reflected light rays through said uncovered portion.

3. A device of the character described comprising a deflector plate to be disposed in the mouth of a reflector of a lamp casing to cover a part only of such mouth and to leave the other part of the mouth uncovered, a light shield in the reflector between the source of light and the uncovered portion of said mouth, and an adjustable connection between said plate and shield for supporting the shield from said plate.

4. A device of the character described comprising a plate to be fixed in the mouth of a reflector of a lamp casing to cover part only of the mouth of the reflector and to leave the other part of the mouth uncovered, a light shield to extend partly around the source of light in the reflector for restricting the direct passage of light rays through the uncovered portion of said mouth, and means for adjustably supporting said shield from said plate.

5. A device of the character described comprising a deflector plate to be disposed in the mouth of a reflector of a lamp casing, supporting means extending rearwardly from said plate, and a light shield for the source of light within the reflector adjustably supported by said means.

6. A device of the character described comprising a deflector plate to be disposed in the mouth of a reflector of a lamp casing, arms extending rearwardly from said plate, and a light shield for the source of light within the reflector slidably mounted on said arms.

7. A device of the character described comprising a deflector plate to be disposed in the mouth of a reflector of a lamp casing, arms extending rearwardly from said plate, and an arched light shield to be disposed partly around the source of light within the reflector and having portions slidably engaging said arms.

In testimony whereof I have signed my name to this specification.

LOUIS F. GEILS.